US011397935B2

(12) United States Patent
Kutalek et al.

(10) Patent No.: US 11,397,935 B2
(45) Date of Patent: Jul. 26, 2022

(54) SYSTEM AND METHOD FOR WIRELESS TRANSACTIONS

(71) Applicant: Hover Developer Services, Inc., Seattle, WA (US)

(72) Inventors: David Lewis Kutalek, Hightstown, NJ (US); Benjamin Morris Lyon, Seattle, WA (US); Michael Scott Benedict, Bayside, NY (US)

(73) Assignee: Hover Developer Services, Inc., Seattle, WA (US)

( * ) Notice: Subject to any disclaimer, the term of this patent is extended or adjusted under 35 U.S.C. 154(b) by 195 days.

(21) Appl. No.: 15/943,248

(22) Filed: Apr. 2, 2018

(65) Prior Publication Data

US 2019/0303912 A1 Oct. 3, 2019

(51) Int. Cl.
*G06Q 20/32* (2012.01)
*H04L 67/141* (2022.01)
(Continued)

(52) U.S. Cl.
CPC ........... *G06Q 20/3223* (2013.01); *G06F 8/77* (2013.01); *G06Q 20/325* (2013.01);
(Continued)

(58) Field of Classification Search
CPC ........... G06Q 20/3223; G06Q 20/4012; G06Q 20/325; G06Q 2220/00; G06Q 20/3672;
(Continued)

(56) References Cited

U.S. PATENT DOCUMENTS 5,892,900 A * 4/1999 Ginter ..................... G06F 21/10
726/26
2004/0098350 A1 5/2004 Labrou
(Continued)

FOREIGN PATENT DOCUMENTS

EP 2323311 5/2011

OTHER PUBLICATIONS

"Help & Tips #4: 3 Steps to Turn on Accessibility Settings," True Balance, Blog Post, Oct. 2015 http://truebalance.io/blog/2015/10/06/help-tips-2-3-steps-recharge-rewards-true-balance/ [retreived Dec. 18, 2018], 13 pages.
(Continued)

*Primary Examiner* — Patrick McAtee
*Assistant Examiner* — Vincent I Idiake
(74) *Attorney, Agent, or Firm* — Davis Wright Tremaine LLP; Michael J. Donohue (57) ABSTRACT

A system and method for wireless transactions provides a software development kit (SDK) that provides accessibility to inherent communication capabilities within a wireless communication device. The communication capabilities are normally not accessible to a software developer. However, the SDK provides an appropriate interface that permits a software developer to create application programs for a variety of transactions between the wireless communication device and a mobile network operator (MNO). In some transactions, the MNO may function as a financial service provider in which a user has an account with an associated monetary value. The SDK provides a simplified technique for executing a financial transaction, such as making a payment or transferring money by presenting easy-to-use menus that avoid the difficulty of memorizing transaction codes, user phone numbers, and the like.

10 Claims, 9 Drawing Sheets

(51) Int. Cl.
*G06Q 20/40* (2012.01)
*G06F 8/77* (2018.01)
*H04W 84/04* (2009.01)
*H04W 8/18* (2009.01)

(52) U.S. Cl.
CPC ..... *G06Q 20/3263* (2020.05); *G06Q 20/4012* (2013.01); *H04L 67/141* (2013.01); *G06Q 2220/00* (2013.01); *H04W 8/183* (2013.01); *H04W 84/042* (2013.01)

(58) Field of Classification Search
CPC .... G06Q 20/356; G06Q 20/32; H04L 67/141; G06F 8/77; H04W 84/042; H04W 8/183; H04W 4/14; H04M 1/72522; H04M 1/2748
See application file for complete search history.

(56) References Cited

U.S. PATENT DOCUMENTS

| | | | | |
|---|---|---|---|---|
| 2005/0233733 | A1* | 10/2005 | Roundtree | G06F 9/454 |
| | | | | 455/414.1 |
| 2011/0217994 | A1* | 9/2011 | Hirson | G06Q 30/04 |
| | | | | 455/466 |
| 2011/0237296 | A1 | 9/2011 | Coppinger | |
| 2012/0179908 | A1* | 7/2012 | Duma | G16H 10/65 |
| | | | | 713/165 |
| 2013/0018740 | A1 | 1/2013 | Fisher | |
| 2013/0159186 | A1 | 6/2013 | Brudnicki | |
| 2014/0171023 | A1 | 6/2014 | Owen | |
| 2014/0220927 | A1* | 8/2014 | Girard | H04M 15/09 |
| | | | | 455/405 |
| 2015/0302413 | A1 | 10/2015 | Dua | |
| 2016/0012465 | A1* | 1/2016 | Sharp | G06Q 20/10 |
| | | | | 705/14.17 |
| 2016/0092696 | A1* | 3/2016 | Guglani | H04W 12/08 |
| | | | | 726/26 |
| 2016/0105530 | A1 | 4/2016 | Shribman | |
| 2017/0205979 | A1* | 7/2017 | Badge | G06Q 10/101 |
| 2018/0014239 | A1* | 1/2018 | Chau | H04W 8/183 |
| 2018/0165703 | A1* | 6/2018 | Oshry | G06Q 20/387 |

OTHER PUBLICATIONS

International Search Report and Written Opinion dated Jun. 25, 2019, issued in International Patent Application No. PCT/US2019/025138, filed Apr. 1, 2019, 9 pages.

Madlmayr, G., et al., "The Benefit of Using SIM Application Toolkit in the Context of Near Field Communication Applications," IEEE Computer Society, 2007, (presented at International Conference on the Management of Mobile Business (ICMB 2007), Jul. 9-11, 2007) 8 pages.

Extended European Search Report dated Dec. 23, 2021, issued in European Patent Application No. 19782280.2, filed Apr. 1, 2019, 12 pages.

* cited by examiner

SYSTEM AND METHOD FOR WIRELESS TRANSACTIONS

BACKGROUND OF THE INVENTION

Field of the Invention

The present invention is directed to wireless transactions and, more particularly, to a system and method for providing tools to software developers to streamline wireless transactions.

Description of the Related Art

Wireless communication devices, such as cell phones, smart phones, and the like, are ubiquitous. Wireless communication devices have evolved from simple voice communication devices to sophisticated computing platforms with color touch screen displays, global positioning system (GPS) receivers, and communication capabilities that include voice, text, and network communication that permit gaming, audio and video streaming from a network, and audio and video input devices that permit audio and video to stream from the wireless communication device.

Two different technologies have evolved to become the de facto standards for wireless communication; CDMA and GSM are two widely used communication standards, particularly in the United States. In Europe and other areas of the world, GSM is a more widely accepted standard.

In addition to the sophisticated communication capabilities described above, most GSM network operators offer services to their users via a communication protocol known as Unstructured Supplementary Service Data (USSD). The USSD capability was developed as part of the 3GPP mobile standard and defines a connection mode teleservice in which the association between endpoints is called a "transaction." In GSM, USSD transactions from the mobile device (sometimes referred to as a User Equipment (UE)), can terminate at the mobile switching center (MSC), the Visitor Location Register (VLR), or the Home Location Register (HLR). Thus, USSD permits a GSM wireless communication device to communicate with its mobile network operator (MNO). The GSM network operators offer services that include, but are not limited to, personal finance applications. To access these services, a user must dial a short code, which is typically a sequence of digits preceded by a predetermined character, such as "*", "#", or the like that are used to dial up a particular service. After dialing a short code, the user is presented with a series of text-based menus on the screen of their wireless communication device. While such menus are compatible with virtually every wireless communication device, they are slow, cumbersome, and error prone for users. Therefore, it can be appreciated that there is a significant need for techniques that will simplify user interaction with their wireless communication device to conduct transactions. The present disclosure provides this, and other advantages, as will be apparent from the following detailed description and accompanying Figures.

DETAILED DESCRIPTION OF THE INVENTION

Figure 1:
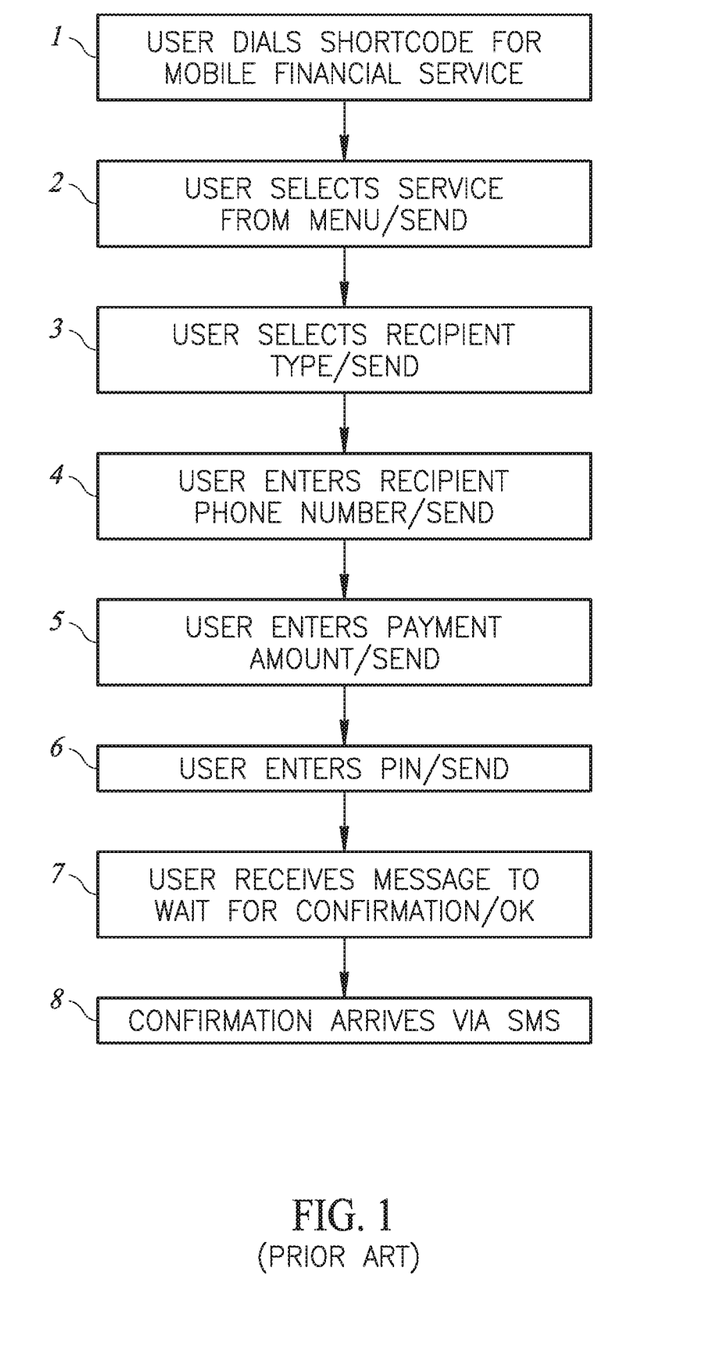
FIG. 1 is a flow chart illustrating the operation of a conventional USSD transaction.

As noted above, a GSM mobile device can utilize built-in capabilities for communicating with a mobile network operator (MNO). In the example discussed above, a communication protocol known as Unstructured Supplementary Service Data (USSD) permits communication between the mobile device and the MNO. However, the implementation of a transaction using USSD is cumbersome. For example, one application for USSD is a peer-to-peer transaction to send money. In step 1, the user dials a "short code" to activate a mobile financial service. Those skilled in the art will appreciate that a short code is a multi-digit alphanumeric code to activate a particular service. In the example of FIG. 1, at step 1, the user may enter a short code for mobile money service, such as "*150*01#" to activate the mobile money service. If the user enters an incorrect short code, an error will occur. The mobile device must have the correct subscriber identity module (SIM) card in their mobile device or the service will not respond. Those skilled in the art will appreciate that the initial data entry opens up a communication channel between the mobile communication device and the MNO via a cellular communication link. Thereafter, each data entry step performed by the user comprises an additional data exchange via the open communication channel. Depending on the specific implementation the wireless devices will generate an error message if the data entry is incorrect at a particular step while other implementations simply generate an error message at the end of the data entry process.

In step 2, the user selects a desired service from a menu by entering the corresponding numeric digit. Following selection of the numeric digit, the user presses a "Send" button. In step 3, the user selects a recipient type by entering another numeric digit and again presses a Send button.

In step 4, the user must enter the recipient's telephone number and again presses the Send button. In step 5, the user enters the desired payment amount and presses the Send button.

In step 6, the user enters a personal identification number (PIN) and presses the Send button. In step 7, the user receives a message indicating that the transaction is in progress and that the user should wait for confirmation. The user presses an "OK" button in response to the transaction message.

If all of the above data has been entered successfully, the user receives a confirmation message, in step 8, which typically is sent via short messaging service (SMS).

As can be appreciated by those skilled in the art, the user must not make any errors in entering any of the data in any of steps 1-7 or the process will fail. The user must know the various short codes for different transactions and must know the phone number of the recipient. Each of steps 1-7 in FIG.

1 are interactive steps with the payment service and must be completed quickly to avoid time-out errors, which may occur if no response is received within a specified time (often less than one minute). In addition, an incorrect data entry at any step will cause the overall process to fail. That is, data is sent from the user mobile device, using USSD, to the MNO for each step and a response must be received from the MNO to display the next menu on the display of the user mobile device. The combination of short time deadlines and the requirement for error-free data entry can increase stress on the user initiating the transaction.

In contrast, the process described in greater detail below provides tools to a software developer that simplify USSD communication. The user does not have to remember a short code for the desired service or correct pathway through the menus. In addition, the user does not have to enter the phone number directly. In one embodiment, the user can rely on a contact list already stored in the mobile device to select the payment recipient. As will be described in greater detail below, the system and method described herein provide tools in the form of a software development kit (SDK) that developers can include in their own code to simplify the functionality and interaction with the USSD for transactions such as a payment service.

As will be described in greater detail below, the SDK allows software developers to incorporate GSM network operator services into a modern user interface using a set of Man-Machine-Interface (MMI) codes to control a transport layer in the wireless communication device. There are several kinds of MMI codes defined and used in wireless communication devices depending on the specific implementation by different device manufacturers. For example, MMI codes can be implemented as USSD codes or Supplementary Service (SS) codes, manufacturer defined MMI codes, SIM codes, and the like. The system described herein can be configured for operation with any of these code sets. Those skilled in the art will appreciate that the SDK works with the available set of MMI codes built into the wireless communication device by the manufacturer or provided by the network, such as USSD codes that are features provided by a USSD gateway of the MNO. The examples presented herein are applicable to a mobile device using an Android™ operating system. However, those skilled in the art will appreciate that the principles described herein may be applied to mobile devices using other operating systems.

For example, SS codes are often used in the U.S. for simple operations, such as determining the current amount of your phone bill, your data usage in the current billing cycle, and the like. These are often single step operations in that a user enters the appropriate SS code and receives the response. They are generally not related to more complex transactions, such as the exchange of money.

In contrast, USSD codes are widely used for a defined set of transactions. In addition, the SDK described herein works in a similar manner with a SIM tool kit (STK), which is set of commands programmed into the SIM card to define how the SIM should interact directly with the outside world and initiates commands independently of the handset and the network. The STK enables the SIM to build up an interactive exchange between a network application and the end-user to provide access to or control access to the MNO. The SIM also provides commands to the handset such as displaying menus and/or requesting user input.

Figure 2:
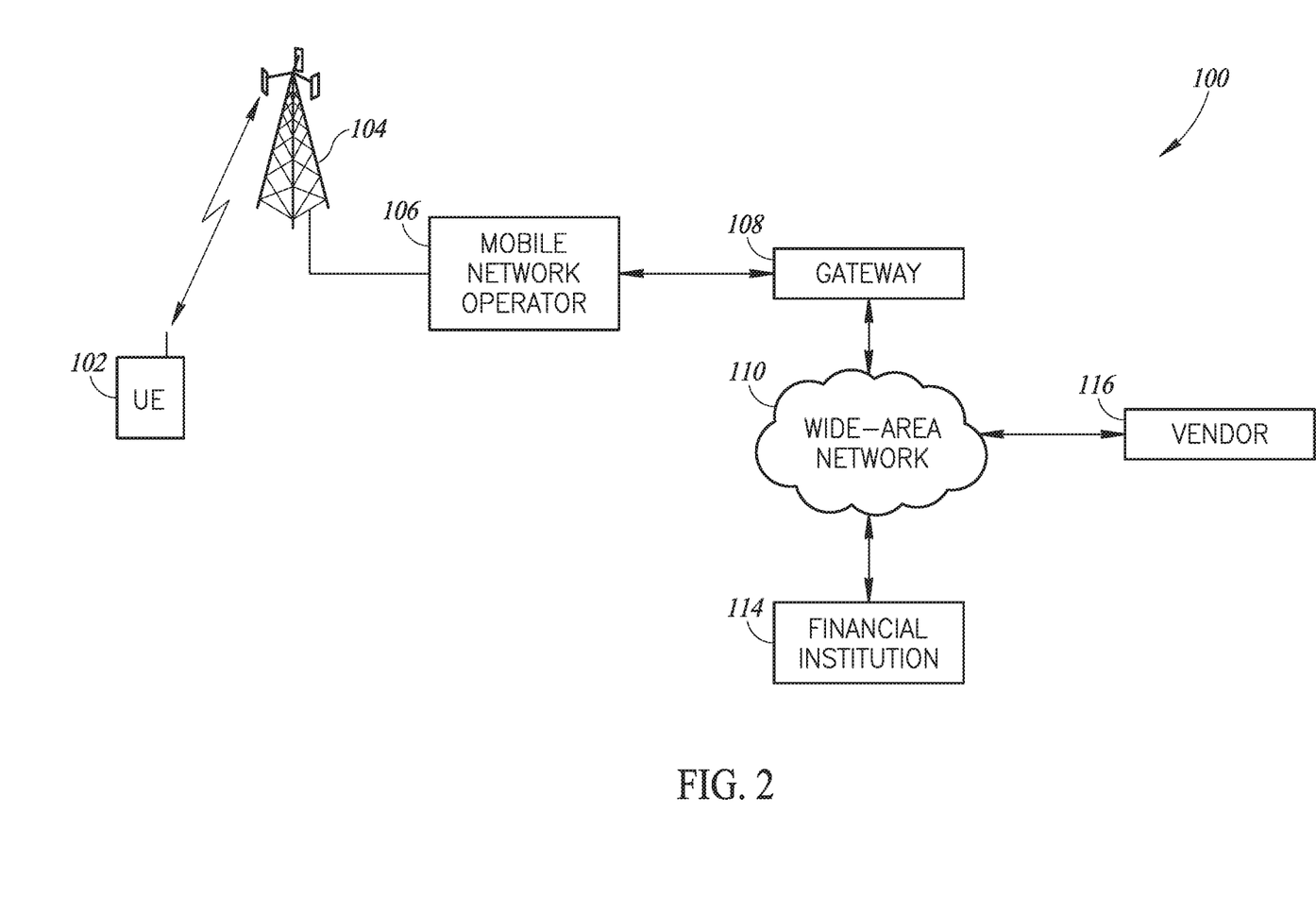
FIG. 2 illustrates a system architecture in which the present system operates.

The present invention operates as part of a system 100, illustrated in a system architecture diagram of FIG. 2. A user equipment (UE) 102, is typically implemented as a mobile communication device, smart phone, or the like. The UE 102 communicates with a base station 104, which is part of a mobile network operator (MNO) 106. For the sake of simplicity, FIG. 2 only illustrates a single base station 104. However, those skilled in the art will appreciate that a typical mobile network operator has a large number of base stations providing broad areas of coverage.

The MNO 106 is connected via a gateway 108 to a wide-area network (WAN) 110, such as the Internet. FIG. 2 also illustrates a financial institution 114 and a vendor 116 coupled to the WAN 110. In some implementations, transactions may occur between the UE 102 and the vendor 116 via the MNO 106 and the WAN 110. The vendor 116 may establish its own set of short codes for communication using any of the MMI codes described above. The most common implementations use USSD or STK. In other implementations, transactions may occur between the UE 102 and the financial institution 114 via the MNO 106 and the WAN 110. The financial institution 114 may establish its own set of short codes for communication using any of the MMI codes described above. The most common implementations use USSD or STK.

In other implementations, the MNO also effectively functions as the bank for financial transactions. This is especially true of lesser developed countries where there are few banks and access to banking is not available to large portions of the population. For example, many sub-Saharan countries have unreliable banking institutions. In such situations, credit/debit cards and checking accounts are not available to the population. The MNO effectively functions as a financial service provider where subscribers load money into their account, associated with the user's mobile phone number, and make payments in the manner described herein.

In many of these implementations, the cell phone manufacturer incorporates its own set of short codes for communication using any of the MMI codes described above. These codes are effectively "built-in" to the UE 102. Again, the most common implementations use USSD or STK.

Figure 3:
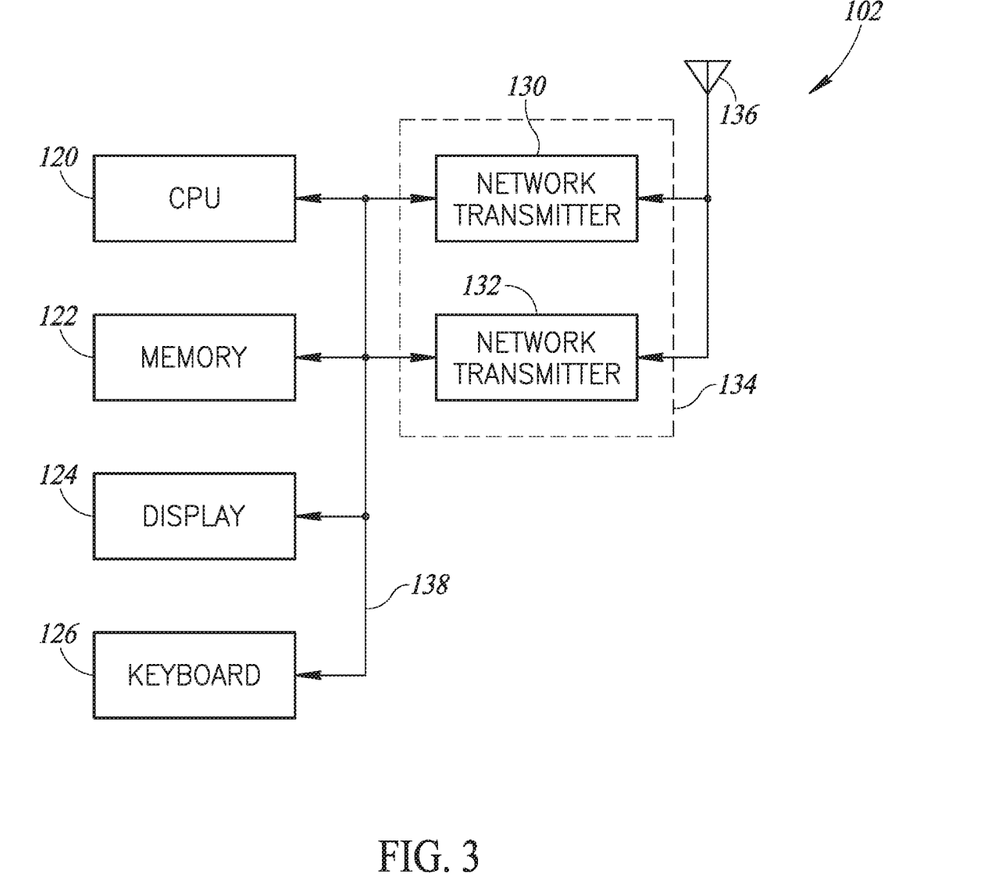
FIG. 3 illustrates a functional block diagram of the wireless communication device of FIG. 2.

FIG. 3 is a functional block diagram illustrative of the UE 102 illustrated in FIG. 2. The wireless communication device 102 includes a central processing unit (CPU) 120. Those skilled in the art will appreciate that the CPU 120 may be implemented as a conventional microprocessor, application specific integrated circuit (ASIC), digital signal processor (DSP), programmable gate array (PGA), or the like. The wireless communication device 102 is not limited by the specific form of the CPU 120.

The wireless communication device 102 in FIG. 3 also contains a memory 122. The memory 122 may store instructions and data to control operation of the CPU 120. The memory 122 may include random access memory, ready-only memory, programmable memory, flash memory, and the like. In general, the memory 122 contains data and instructions that are executed by the CPU 120. The wireless communication device 102 is not limited by any specific form of hardware used to implement the memory 122. The memory 122 may also be integrally formed in whole or in part with the CPU 120.

The wireless communication device 102 of FIG. 2 also includes conventional components, such as a display 124 and keypad or keyboard 126. In many implementations, the display 124 is a touch-sensitive display that also provides the functionality of the keyboard 126. These are conventional components that operate in a known manner and need not be described in greater detail. Other conventional components found in wireless communication devices, such as a USB interface, WiFi interface, Bluetooth interface, camera/video device, infrared device, and the like, may also be included in the wireless communication device 102. For the sake of clarity, these conventional elements are not illustrated in the functional block diagram of FIG. 3.

The wireless communication device 102 of FIG. 3 also includes a network transmitter 130 such as may be used by the wireless communication device 102 for normal network wireless communication with the base station 104 (see FIG. 2). FIG. 3 also illustrates a network receiver 132 that operates in conjunction with the network transmitter 130 to communicate with the base station 104. In a typical embodiment, the network transmitter 130 and network receiver 132 are implemented as a network transceiver 134. The network transceiver 134 is connected to an antenna 136. Operation of the network transceiver 134 and the antenna 136 for communication with the base station 104 is well-known in the art and need not be described in greater detail herein.

The various components in the functional block diagram of FIG. 3 are coupled together by a bus system 138, which may include an address bus, data bus, control bus, and power bus. For the sake of convenience, the various buses are illustrated in FIG. 3 as the bus system 138.

Figure 4:
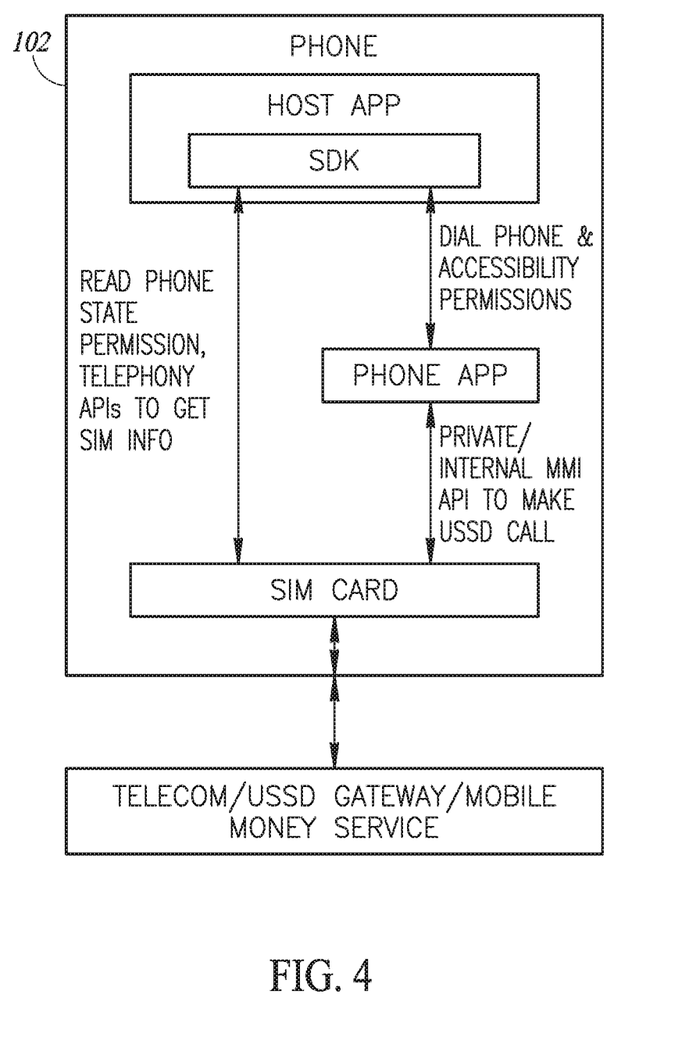
FIG. 4 illustrates an example open systems interconnection (OSI) architecture of the wireless communication device of FIG. 2.

To aid in the understanding of the implementation of the SDK within the UE 102, FIG. 4 illustrates a version of an Open Systems Interconnection (OSI) reference model illustrating an exemplary system architecture for the UE 102.

In operation, a host application is a software application program developed by application developers who make use of the SDK. The software application program is a series of instructions stored in the memory 122 (see FIG. 3) and executed by the CPU 120 on the UE 102. The SIM card communicates with the network transceiver 134, which is the physical layer in the OSI model of FIG. 4. The software application program is the application layer in the OSI model. The SDK provides interconnectivity between the software application program and the physical layer (via the SIM card). The SDK provides an interface for use by the software developer.

As discussed above, the mobile device may have pre-programmed "menus" for communication with the MNO. For example, a mobile device may include a set of USSD codes that serve as a menu to control communications between the mobile device and the MNO. Other forms of MMI codes may similarly function as menus. In the description herein, specific functions that are USSD functions or STK functions are identified as such. However, some of the "menus" are generic to both USSD and STK, for example. Those generic functions are identified herein as a SIM menu item to denote functions that may be any form of MMI, such as USSD or STK.

Those skilled in the art will appreciate that, in the absence of the SDK, the menus on the SIM card are not accessible to software developers in any form, and that most of the services provided in the SIM menus have no other publicly available form of access. The SDK makes these previously inaccessible services available to software developers. Specifically, software developers can make SIM menu services available to their users from within the software application programs, thus making the application program faster and more fully featured and convenient for end-users. In addition, the SDK permits developers to pass variables to the SIM menu services, including input from the user into the host software application program. As will be described below, the user input may be in the form of keyboard inputs or selections from stored contact lists, and the like. Furthermore, the SDK allows the software developers to receive confirmation messages and data values, such as confirmation codes, thus allowing the developers to programmatically confirm the success or failure of taking actions on a SIM menu service.

Because of improved user accessibility and the ability of the SDK to automate input to the SIM menus, the data session speed can be increased by approximately 90 percent. The SDK also provides greater confidence in the transaction and reduced stress because the SDK significantly reduces the likelihood of a time-out error or a user error by providing the tools that permit software developers to create better interfaces. The software developers can use typical smart phone features, such as a user's stored contacts, to ensure data entry is correct and to provide end-users with better visual feedback. In addition, the end-user does not need to remember short codes or pathways through complex menus, nor does the user need to remember phone numbers to dial. These aspects greatly increase the speed and efficiency of the communication session.

Figure 5A:
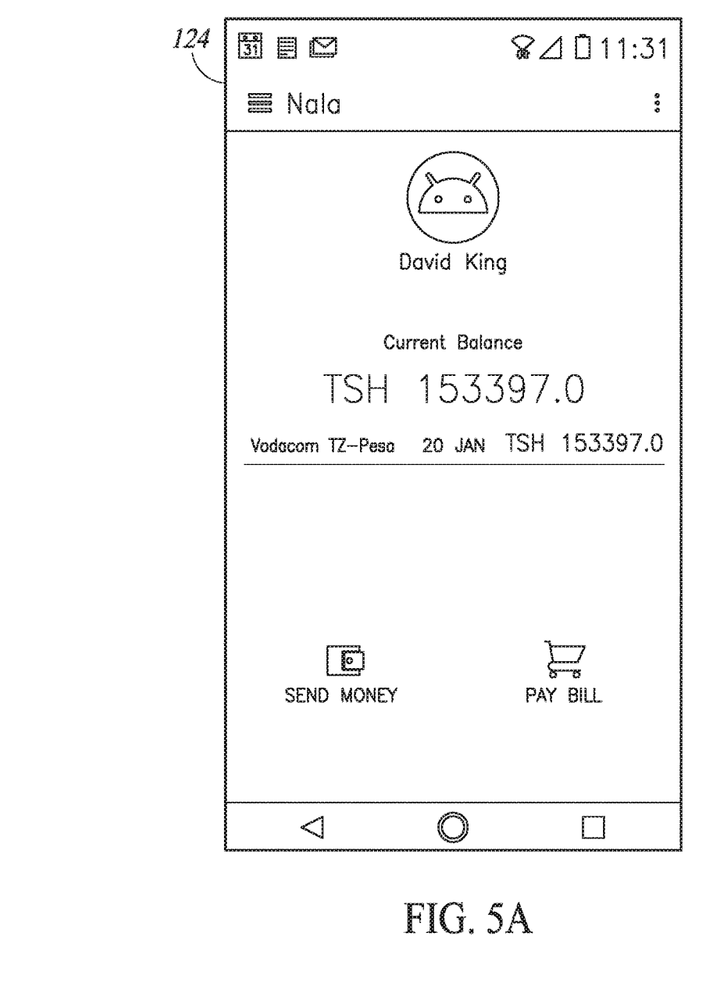
FIGS. 5A-5F are sample screen shots illustrating an example transaction by the wireless communication device of FIG. 2.

FIGS. 5A-5F are a series of screen shots illustrating an example transaction utilizing the SDK. In FIG. 5A, the user has activated the software application program to execute a financial transaction. Those skilled in the art will realize the other forms of transactions may also be executed using the SDK. The software application developers can use the SDK to communicate with the SIM menu for a variety of transactions. Returning to FIG. 5A, the software application in this example is a financial transaction application. Upon activation of the software application program, the software developer can show the current balance in the user's account with the mobile network operator. This particular example depicts operation with an MNO 106 in Tanzania and the monetary denomination is Tanzanian Shillings. Also illustrated in the display 124 on FIG. 5A is an option to send money or to pay a bill. If the "Send Money" option is selected by tapping on the display 124, the software application program displays the example in FIG. 5B and opens the user contact list. As the user types in the first letters of the desired contact (e.g., "Ben"), the contact list shows the available options. The user selects the desired payee by clicking on the desired entry in the contact list.

Figure 5B:
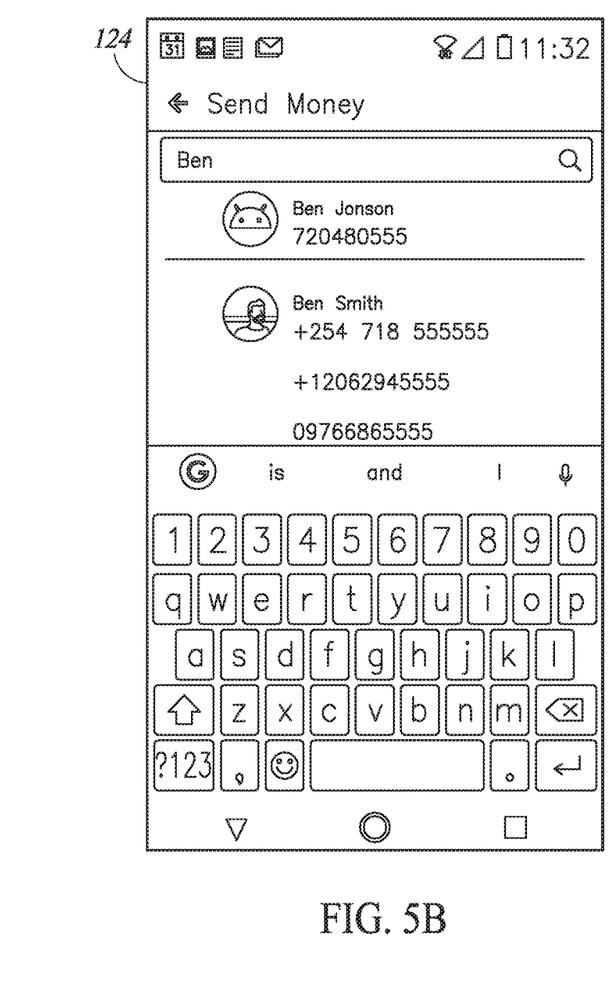
Figure 5C:
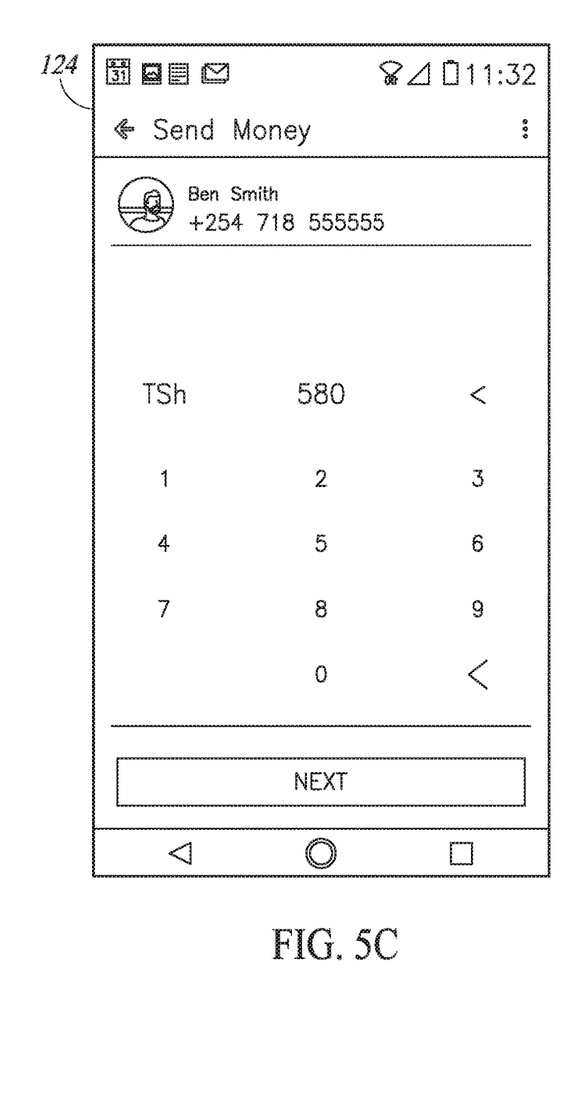
Figure 5D:
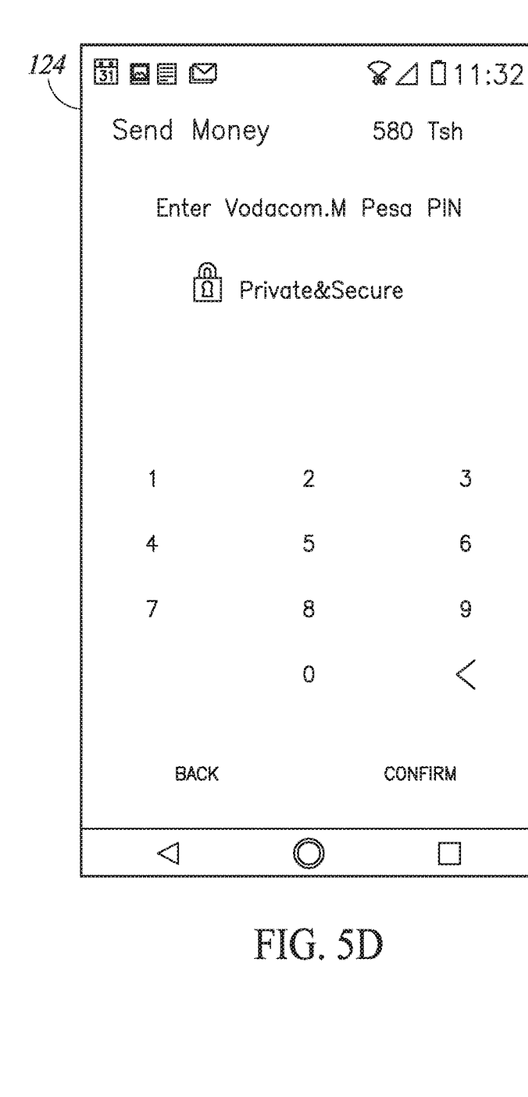

As a result of selecting a particular payee from the contact list, the software application program has the name of the correct payee and the correct contact phone number. After selection of the payee, the software application program displays the screen shot of FIG. 5C with a numerical keypad to allow the user to select the payment amount. The user presses the "Next" button to move to the next screen. In the example of FIG. 5D, the user must enter a PIN to verify user identity. Those skilled in the art will appreciate that not all transactions require a PIN. Upon entry of the PIN, the user has provided all necessary information to complete the transaction. The PIN is highly sensitive personal information. It is stored securely in an encrypted location in the UE 102, such as an Android keystore. When the user enters a PIN, such as illustrated in FIG. 5D, the SDK temporarily stores the PIN in the encrypted keystore. At the appropriate time in the transaction, where it is necessary for the UE 102 to transfer the PIN to the MNO 106, the SDK accesses the encrypted PIN in the keystore and decrypts the PIN for transmission to the MNO. For added security, the PIN is also typically deleted from the UE 102 after the PIN is transmitted to the MNO 106.

At this stage of the process, the software application program can use the SDK to open a communication channel between the UE 102 and the base station 104. In the prior art systems, as illustrated in the example flow chart of FIG. 1, a communication channel is opened between the UE 102 and the base station 104 upon entry of the short code for a mobile money service. This means that all communications over the open communication channel in the prior art are subject to time-out errors or possible mistaken entry of data by the user. In contrast, the simplified menus of FIGS. 5A-5D have provided guidance to the user in selecting the type of transaction, the payment amount, the recipient, and the entry of a PIN validation. Only at this stage does the UE 102 need to open a communication channel with the base station 104. The exchange of data between the UE 102 and the MNO 106 using steps 1-6 in FIG. 1 may still occur, but those steps are transparent to the user. That is, the software application program already has all necessary data to complete the transaction and, using the SDK, the data exchange between the UE 102 and the MNO 106 is controlled by the SDK. The SDK enters the appropriate short code to open the communication channel and initiate a mobile money service transaction. The SDK knows which menu item to select for a process to send money and automatically selects that option without having to display any menu options for the user while the communication channel is open. Furthermore, the SDK already knows the payee and the payee phone number and can automatically enter those in response to communications from the MNO 106 in an automatic fashion without any further user input required. The SDK also knows the amount of payment and the user PIN (accessed from its secure location in the encrypted keystore) and transmits those to the MNO 106 at the appropriate point during the transaction.

Figure 5E:
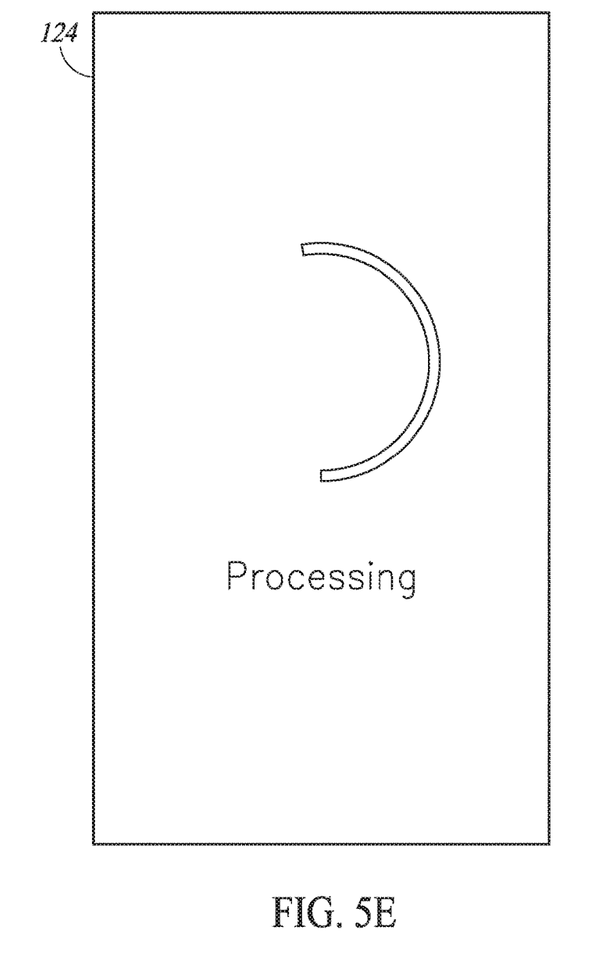

When all necessary information has been sent to the MNO 106, the SDK can display a message, similar to that illustrated in FIG. 5E to indicate to the user that the transaction is being processed. Once the MNO 106 begins processing the transaction, the user can operate the UE 102 in a normal fashion while the transaction is being processed. Upon completion of the transaction, the SDK causes a message, similar to that illustrated on the display 124 in FIG. 5F, to confirm that the transaction has been completed. The software developer can also display any further information to the user, such as the transaction time and date, transaction confirmation number, new account balance, and the like. Thus, the SDK provides a simplified interface for software developers who, in turn, can provide a broad range of software application programs that make it easy for the end-user to utilize services that were otherwise unavailable on their device.

Figure 6:
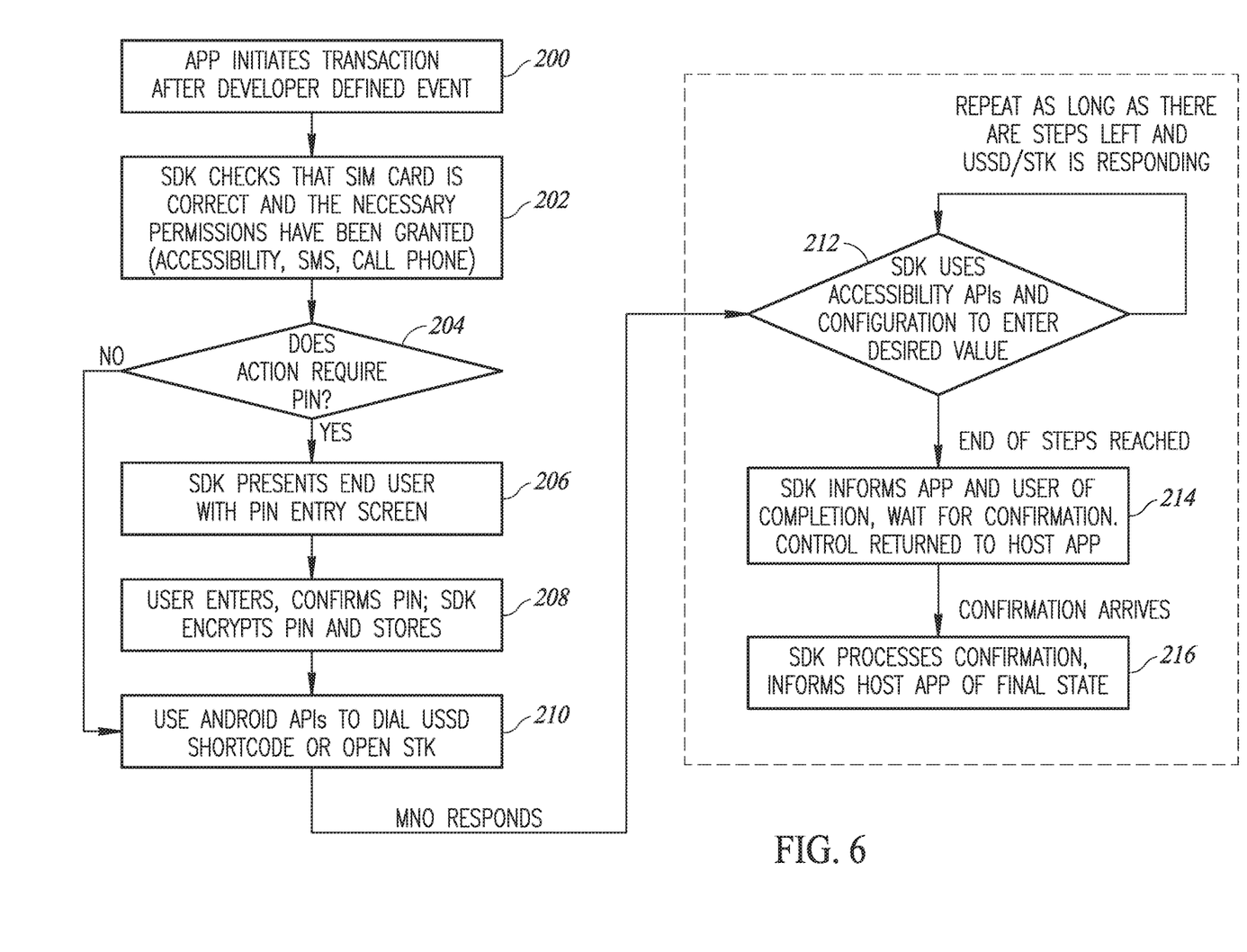
FIG. 6 is a flow chart illustrating the operation of the system of FIG. 2.
Figure 7:
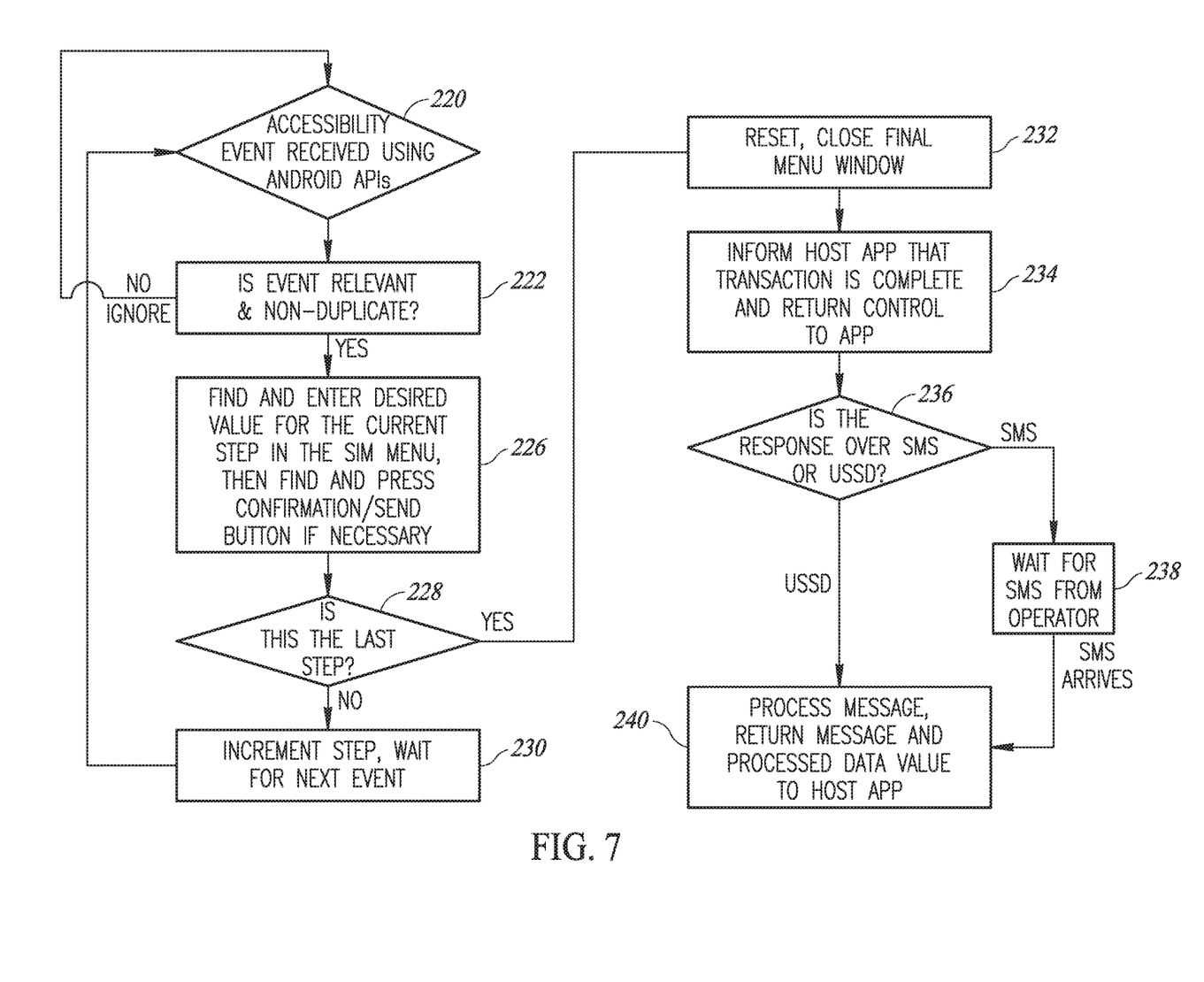
FIG. 7 is a flow chart illustrating further operational details of the system of FIG. 2.

The flowcharts of FIGS. 6 and 7 provided additional details of the processes executed by the SDK to control transactions between the UE 102 and the MNO 106. The software application program, implemented with the SDK has already been downloaded and installed on the UE 102 at the start of FIG. 6. At step 200, the user activates the software application program and the application program initiates a transaction following a software developer-defined event.

At the outset, in step 202 the SDK confirms that the SIM card is correct and that all necessary permissions have been granted, such as accessibility, SMS capability, and the ability to make phone calls. In some cases, the UE 102 may contain multiple SIM cards. The SDK also checks to make sure that the correct SIM card is in place and being utilized for the current transaction. The term accessibility refers to a series of application program interfaces (APIs) that allow a software application or, in the present case, the SDK, to receive event notices when window contents change. As noted above, the examples contained herein are directed to an Android operating system. The Android Accessibility APIs generate events for specific actions, such as a particular dialogue box popping up on the display screen, the contents of a display window changing, or window scrolling. There are approximately twenty possible Android Accessibility events. Those skilled in the art will appreciate that the events also identify from which software program or SDK the event originated. The SDK described herein specifies which software application windows to listen for (e.g., the phone app and the STK app) and which action(s) for which it wishes to receive notifications. Using these notifications, the Android Accessibility APIs permit the SDK to receive the contents of the relevant window for the specified event. This enables the SDK to parse the textual contents of the window, find the text input, enter text into the input, find the buttons, such as "Send", and activate the buttons. In the example of FIG. 5B, when a dialog box pops up, the software application program might receive accessibility events, such as "Window Content Change" and "Window State Change" events. The SDK can use one of those events to retrieve the window content and to interact with the window. Other events could be ignored as duplicates.

In step 202, when the SDK is granted accessibility permissions, the SDK defines which Android Accessibility events are of interest. As will be discussed later, the SDK receives notification when one of the events of interest has occurred and can read the contents of the event.

In decision 204, the SDK determines whether the particular action requires entry of a user PIN. If a PIN is required, the result of decision 204 is YES and, in step 206, the SDK presents the end-user with a PIN entry screen, such as that illustrated in FIG. 5D. The user enters the PIN in step 208 and confirms entry of the PIN. As discussed above, the SDK encrypts the PIN and stores it in the secure keystore in the UE 102 until needed during the transaction.

If a PIN is not required for the transaction, the result of decision 204 is NO. In that case, or upon user entry and storage of the PIN in step 208, the process moves to step 210. In step 210, the SDK uses an API programmed into the UE 102 to enter the appropriate USSD short code or to open the STK.

Upon execution of step 210, a communication channel is opened between the UE 102 (see FIG. 2) and the base station 104. The MNO 106 responds to the request associated with the transmitted short code to initiate a transaction.

In step 212, the SDK utilizes accessibility APIs to enter the appropriate data values, as illustrated in the example screen shots of FIGS. 5A-D. As described above, there are a series of data exchanges between the UE 102 and the MNO 106 via the base station 104. In one example, the data exchange steps may be similar or identical to those illustrated in FIG. 1. The difference, however, is that the data exchanges are automatically performed by the SDK; the individual steps do not require any interaction by the user or data entry by the user. The SDK provides the appropriate data to the MNO 106 at each step of the process. The user has already entered the appropriate data, such as transaction type (e.g., Send Money), the recipient and recipient's phone number, the amount of the transaction, and the PIN, if necessary. Step 212 in FIG. 6 is repeated as each piece of data is transmitted from the UE 102 to the MNO 106 and the SDK receives responses from the MNO in the form of further menus provided by the MNO so long as there are still steps remaining in the transaction. When all of the necessary data to complete the transaction has been transmitted from the UE 102 to the MNO 106, step 212 has been completed. As described above, the SDK presents the user with a PIN entry screen if required for the particular transaction. The user-entered PIN is encrypted and stored in the keystore until needed in the transaction. If a PIN is required for the transaction, one of the repeated steps 212 will include transmission of the PIN from the UE 102 to the MNO 106. Prior to transmitting the PIN, the SDK accesses the encrypted PIN from the keystore and decrypts it for transmission to the MNO. For added security, the SDK deletes the PIN after transmission to the MNO 106. Thus, the PIN is only present in the UE for a short period of time and, while present in the UE, is encrypted and stored in the keystore until it is time for transmission of the PIN to the MNO 106.

Upon completion of data entry and acknowledgement in step 214, the SDK informs the software application, and the end-user, of completion of the process and awaiting confirmation, as illustrated in the example screen shot of FIG. 5E. In step 214, the SDK also returns control to the host application. This allows the user to operate the UE 102 in a normal fashion.

Figure 5F:
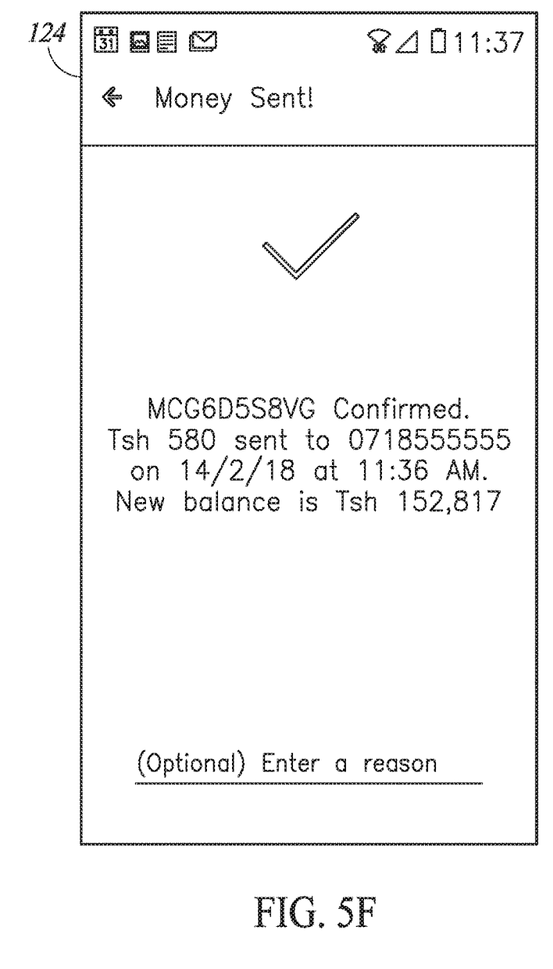

After step 214, the UE awaits confirmation of the transaction from the MNO 106. When the confirmation arrives, the SDK, in step 216, processes the confirmation and informs the software application program of the final state. An example of such confirmation is illustrated in the screenshot of FIG. 5F where a transaction number is provided to the user as well as the transaction amount and the phone number of the payee. In the example of FIG. 5F, the new balance is also provided. Those skilled in the art will appreciate that other types of data may be provided based on the type of transaction.

The flowchart of FIG. 7 provides further details of the data exchange process illustrated in steps 212-216 of FIG. 6. Referring to FIG. 7, in step 220, an accessibility event (e.g., an Android Accessibility Event) has been received using one or more of the APIs built into the UE 102. In decision 222, the SDK determines whether the event is relevant and is a non-duplicate event. If the event is not relevant or is a duplicate, the result of decision 222 is NO and the request is ignored and the process returns to step 220 to receive other event notifications.

If the event is relevant and non-duplicative, the result of decision 222 is YES and, in step 226, the SDK finds and enters the desired value for the current step in the SIM menu and then finds and presses a confirmation/send button if necessary. As discussed above, a transaction requires a sequence of data exchanges between the UE 102 and the MNO 106. For example, the process illustrated in FIGS. 5A-5E requires selection of a transaction type (e.g., "Send Money"), payee name and phone number, and the like. Each data exchange is a separate step, using USSD, STK, or the like, that is automatically (i.e., without any user operations) performed at the appropriate time by the SDK. In decision 228, the SDK determines whether the last data has been entered for the transaction. If this is not the last step, the result of decision 228 is NO and, in step 230, the SDK increments the step and waits for the next event. Control of the process is then returned to step 220.

If this is the last step, the result of decision 228 is YES. In that event, in step 232, the SDK closes the final menu window and, in step 234 informs the host application that the transaction is complete. Control of the process is returned to the software application program. As noted above, the user may operate the UE 102 in a normal fashion while the transaction is being processed.

In decision 236, the SDK determines whether a response received from the MNO 106 is an SMS response or a USSD response. If the response is an SMS response, the SDK waits for an SMS from the MNO in step 238. When the SMS arrives, the message is processed in step 240.

If the response is a USSD response, in decision 236, the SDK processes the message in step 240 and returns the message and processed data values to the host application program. This is illustrated in the example of FIG. 5F.

Thus, the SDK provides accessibility to functional features in the UE 102 that are not otherwise available to a user. In addition, the SDK provides an interface that simplifies the creation of software application programs and presents simplified menus to a user. The simplified data entry process, and the automatic exchange of data controlled by the SDK increases the transaction speed and accuracy.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A method in a wireless communication device having a display and cellular network transceiver for communication with a mobile network operator (MNO) associated with the wireless communication device, the wireless communication device having an operating system to control operation of the wireless communication device, the method comprising:
   initializing, by a user of the wireless communication device, a software application program on the wireless communication device to thereby initiate a transaction, the software application program using a software development kit (SDK) providing an interface between the software application program and a transport layer of the wireless communication device;
   presenting, by the software application program, a plurality of user menus on the display to display information useable to facilitate user selection of data required to complete the initiated transaction;
   in response to the display of the plurality of user menus, the software application receiving the user-selected data required to complete the initiated transaction;
   the SDK assuming operational control of the wireless communication device by providing an interface with the software application program to receive the user-selected data required to complete the initiated transaction;
   upon receipt of the user-selected data required to complete the initiated transaction by the software application program, the SDK using the transport layer and the cellular transceiver to open a communication channel with the MNO;
   upon successful opening of the communication channel with the MNO, the SDK receiving a sequence of data requests from the MNO and, in response to each of the data requests received from the MNO, the SDK interacting with one or more accessibility application program interfaces (APIs) to control the cellular transceiver receiving a piece of the user-selected data for transmission to the MNO until all data required to complete the initiated transaction has been transmitted to the MNO via the open communication channel, the data requests received from the MNO and transmission of the user-selected data to the MNO comprising data exchanges that are automatically performed by the SDK and do not require any interaction by the user or data entry by the user;
   the SDK receiving a confirmation from the MNO that the initiated transaction has been completed;
   upon receipt of the confirmation, the SDK providing a user detectable indication of the confirmation to the software application program; and
   the SDK returning operational control of the wireless communication device to the software application program.

2. The method of claim 1, further comprising:
   the SDK determining whether a personal identification number (PIN) is required to complete the initiated transaction;
   upon the SDK determining that the PIN is required to complete the initiated transaction, the software application program presenting a menu on the display to request user entry of the PIN;
   detecting user activation of an input interface on the wireless communication device to enter the PIN;
   the SDK encrypting the entered PIN; and
   storing the encrypted PIN until needed for transmission to the MNO.

3. The method of claim 2, further comprising:
   decrypting the stored encrypted PIN prior to transmission to the MNO; and
   deleting the PIN from the wireless communication device following transmission of the decrypted PIN to the MNO.

4. The method of claim 1 wherein opening the communication channel with the MNO comprises the SDK initiating an unstructured supplementary service data (USSD) session using an application programming interface (API) in the wireless communication device, wherein the SDK receiving a sequence of data requests from the MNO and the SDK, in response to each of the data requests received from the MNO, providing a piece of the user-selected data until all data required to complete the initiated transaction has been transmitted to the MNO via the open communication channel is performed using USSD.

5. The method of claim 1 wherein opening the communication channel with the MNO comprises the SDK initiating a communication session using a subscriber identity module (SIM) tool kit (STK) using an application programming interface (API) in the wireless communication device, wherein the SDK receiving a sequence of data requests from the MNO and the SDK, in response to each of the data requests received from the MNO, providing a piece of the user-selected data until all data required to complete the initiated transaction has been transmitted to the MNO via the open communication channel is performed using the STK.

6. The method of claim 1 wherein the wireless communication device comprises a subscriber identity module (SIM) card, the method further comprising the SDK confirming that a SIM card in the wireless communication device is correct and that all necessary permissions have been granted to complete the initiated transaction.

7. The method of claim 6 wherein the wireless communication device comprises a plurality of SIM cards, the method further comprising the SDK selecting the SIM card having the necessary permissions for the requested transaction.

8. The method of claim 1 wherein the initiated transaction is a request for the payment of money and presenting, by the software application program, a plurality of user menus on the display to display information comprises presenting user menus of payee related information useable to facilitate user selection of a payee, payee contact information, and payment amount.

9. The method of claim 8 wherein presenting, by the software application program, a plurality of user menus on the display to display information comprises presenting a contact list stored in the wireless communication device useable to select the payee by selecting a contact entry in the contact list, the software application program providing the selected payee information and the payee contact telephone number to the SDK.

10. The method of claim 1, further comprising the SDK receiving a status indicator from the MNO after the MNO has received all necessary data to complete the initiated transaction, the SDK causing a progress indicator to be displayed on the display of the wireless communication device, based on the status indicator received from the MNO.

* * * * *